E. W. SANDERSON.
SANITARY SUGAR BOWL.
APPLICATION FILED JAN. 17, 1913.
1,084,757.
Patented Jan. 20, 1914.
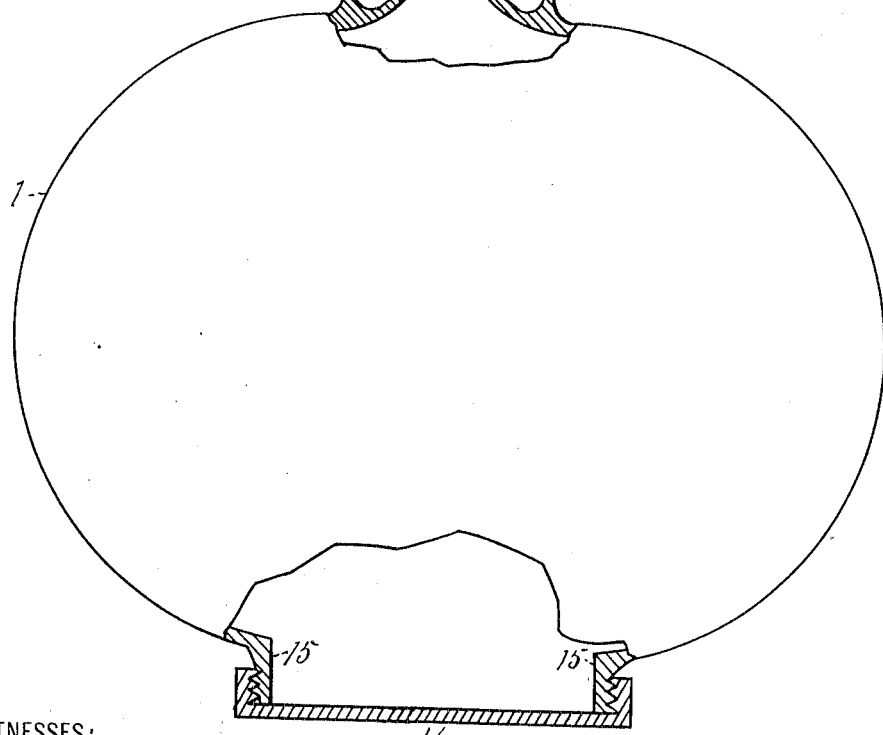

UNITED STATES PATENT OFFICE.

EUGENE W. SANDERSON, OF NEW YORK, N. Y.

SANITARY SUGAR-BOWL.

1,084,757. Specification of Letters Patent. Patented Jan. 20, 1914.

Application filed January 17, 1913. Serial No. 742,529.

*To all whom it may concern:*

Be it known that I, EUGENE W. SANDERSON, a citizen of the United States, and resident of New York, in the county of New York and State of New York, have invented certain new and useful Improvements in Sanitary Sugar-Bowls, of which the following is a specification.

My present invention relates to a bowl for containing sugar, and adapted to maintain the sugar in a sanitary state although adapted also to feed out sugar by the teaspoonful.

The object of the invention is to provide a utensil that shall be readily sterilized and easily operated in the proper manner by the people who use it in restaurants and homes.

Figure 1 is a vertical elevation of the general organization partly in vertical section, and with parts broken away. Fig. 2 is a section at the line $a\ b$ in Fig. 1. Fig. 3 is a section at the line $c\ d$ in Fig. 1.

The general shape is preferably that of a water carafe 1, having two concentric necks 2 and 3. The outer neck 2, is closed to the bowl and projects much higher above said bowl than the inner one 3. The inner neck 3, is open to the carafe and is provided with a screw thread 4 externally located. Upon this thread is screwed a collar 5 to which is securely attached narrow supporting metal arms 6, of which there may be any number. There is an inverted cup 7, whose sides are securely attached to the metal supports 6, so that the said cup is held inverted over the mouth 8 of the inner neck 3 to receive a certain amount of sugar when the whole sugar bowl is inverted in the manner of the ordinary carafe when water is to be poured out. The cup which would in practice hold a teaspoonful of sugar, may be adjusted to hold different quantities by screwing the collar 5 up or down.

At 9, just above the mouth 8 is a deflector fastened to the cup 7, for guiding the sugar from the cup 7 into the annular space 10 between the necks 2 and 3. The sugar may fall between the supporting arms 6, in order to reach this annular space or receiver. The next time the carafe is inverted, this sugar in the receiver 10 is discharged from the neck 2. At the same time, another teaspoonful runs into the cup 7, and so on indefinitely.

In order to keep out dust and germs when the device is on the table, there is provided a cover 11, having a depending guide pin 12 and its head 13. On one side of this cover is a weight 14 so that when the device as a whole is inverted the weighted side will fall downward and outward away from the neck 2 so as not to interfere with the escape of sugar from the receiver 10 to any outside receptacle.

In order that the bowl of the carafe may be filled and thoroughly cleansed occasionally, the bottom thereof may be removable by having a cap or cover 16 screwed upon the base 15 of the bowl.

Without regard to the structure, the operation consists simply in inverting the carafe twice to begin with, when a measured amount of sugar may be obtained from the device for use in tea, coffee, fruit, etc. After this, each inversion will give the same measured amount.

I claim as my invention:—

1. In a sanitary sugar bowl, the combination of a sugar container, concentric necks therefor, one of which opens into said container and is inside the other neck, an inverted cup having its mouth opposite the mouth of said inner neck for receiving sugar when the container is inverted, a guide in said cup opposite the mouth of the inner neck for guiding the sugar from the cup to the annular space between the two necks when the container is right side up, a cover for the outer neck, a pin passing through the cover and attached to the bottom of said cup, a head on the pin for preventing the cover from dropping off when the container is inverted, the inner neck being provided with external screw threads, a collar screwed on said threads, metal supports extending from said collar and attached to the sides of said cup for holding the latter at a position opposite the inner neck for receiving a predetermined amount of sugar when the container is inverted.

2. In a sanitary sugar bowl, the combination of a carafe, an inner neck therefor, an inverted cup adjustable along said neck, an outer neck extending around said inner neck, communicating with the inverted cup, and serving as a second cup, a deflector directly opposite the mouth of the inner neck for deflecting sugar from the first-named cup to the second cup, and a removable cover for the outer neck.

Signed at 526 Broadway, New York city in the county of New York and State of New York this 7th day of January A. D. 1913.

EUGENE W. SANDERSON.

Witnesses:
HENRY H. CARUSO,
WALTER E. BENJAMIN.